(12) United States Patent
Hayes et al.

(10) Patent No.: US 7,603,754 B2
(45) Date of Patent: Oct. 20, 2009

(54) HOOK AND CONNECTOR DEVICE

(76) Inventors: Daniel S. Hayes, 21894 E. Hayden Lake Rd., Hayden Lake, ID (US) 83835; Edwin J. Fehringer, 11296 N. Eastshore Dr., Hayden, ID (US) 83835; Daniel J. Fehringer, 3508 E. Wild Turkey Trail, Coeur d'Alene, ID (US) 83815

( * ) Notice: Subject to any disclaimer, the term of this patent is extended or adjusted under 35 U.S.C. 154(b) by 74 days.

(21) Appl. No.: 11/893,026

(22) Filed: Aug. 14, 2007

(65) Prior Publication Data
US 2009/0044387 A1 Feb. 19, 2009

(51) Int. Cl.
*F16B 45/00* (2006.01)
(52) U.S. Cl. .................. 24/586.1; 24/588.1; 24/DIG. 42
(58) Field of Classification Search .............. 59/78, 59/80, 82, 84–92; 24/372, 588.1–588.12, 24/DIG. 42, 586.1, 586.11
See application file for complete search history.

(56) References Cited

U.S. PATENT DOCUMENTS

| | | | |
|---|---|---|---|
| 1,225,216 A | 5/1917 | Boyer | |
| 1,519,931 A | 3/1924 | Rehbeib | |
| 1,689,824 A | 10/1928 | Goelz | |
| D92,798 S | 7/1934 | Furtsch | |
| 2,447,422 A | * 8/1948 | Nelson | ..................... 24/583.11 |
| 2,738,477 A | 3/1956 | Matthysse | |
| 2,840,878 A | 7/1958 | Olson | |
| 2,916,321 A | 12/1959 | Renfroe et al. | |
| 5,224,247 A | 7/1993 | Collier | |

* cited by examiner

*Primary Examiner*—James R Brittain
(74) *Attorney, Agent, or Firm*—John S. Reid (57) ABSTRACT

A hook-connector includes a first hook part and a second hook part. Each of the first hook part and the second hook part include a first plate and a second plate, and a hub disposed between the first and second plates. The hub holds the first and second plates in essentially parallel, spaced apart relationship. The hub and the first and second plates define a cord opening there-through. The hook-connector further includes a hook member that is attached to a first end of the first and second plates. The hook member includes a hook element that defines a hook opening that is sized to receive the hub of a corresponding hook part. The hook member further defines a sloped portion configured to slidingly mate against the sloped portion of the corresponding hook part in one mating configuration of the first and second hook parts.

11 Claims, 5 Drawing Sheets

HOOK AND CONNECTOR DEVICE

BACKGROUND

Hook devices are well known for securing an elongated flexible member (e.g., a line, cord, rope, cable, strap, chain, etc.) to an anchor point. A "hook device" is any device that is configured to anchor an elongated flexible member to an anchor point in a releasable manner. For example, a simple hook, with an eyelet attached thereto, can serve as a "hook device" to secure an elongated flexible member passed through the eyelet to an anchor point. Likewise, connector devices are well known for coupling (i.e., connecting) two elongated flexible members in series. (See for example U.S. Pat. No. 2,738,477, which describes an in-line clasp connector for an electrical conductor, as well as U.S. Pat. No. 5,224,247, which provides for a strap fastener allowing two straps to be connected in series.) All of these devices allow multiple elongated flexible members to be connected in series. However, the prior art connectors are limited in the ways in which they can be connected.

SUMMARY

One embodiment describe herein below provides for a hook-connector that includes a first hook part and a second hook part. Each of the first hook part and the second hook part include a first plate and a second plate, and a hub disposed between the first and second plates. The hub holds the first and second plates in essentially parallel, spaced apart relationship. The hub and the first and second plates define a cord opening there-through. The hook-connector further includes a hook member that is attached to a first end of the first and second plates. The hook member includes a hook element that defines a hook opening that is sized to receive the hub of a corresponding hook part. The hook member further defines a sloped portion configured to slidingly mate against the sloped portion of the corresponding hook part in one mating configuration of the first and second hook parts.

Other embodiments are provided for herein below.

DETAILED DESCRIPTION

Embodiments of the present disclosure are exemplified in the drawings and will be described using reference numerals to identify various elements and features. Identical or similar elements or features will bear the same reference numerals, and for brevity, description of one element or feature can be understood as describing all other similar or identical elements or features.

As described above, many devices are known for allowing two (or more) elongated flexible members to be connected in series. However, we have determined that none of these devices provide the flexibility to allow three or more elongated flexible members to be connected to one another at a central area using three or more common connectors. (By "common connectors" we mean connectors that are essentially identical to one another in appearance and shape.) That is, in order for the prior art devices to allow three or more elongated flexible members to be connected at a central area, as well as to alternately allow two or more elongated flexible members to be connected in series, some kind of modification is required to the prior art connector components such that they are no longer essentially identical to one another.

We have developed a hook and connector device, as described more particularly below, that includes two common hook parts that are configured to be joined to one another in various ways (as described more fully below), thus providing flexibility of use of the device. For example, in one arrangement two of the common hook parts (each attached to separate ends of a common cord, can be connected to one another to thus form a closed loop (for example, to hold together a bundle of boards or pipes). In another arrangement, two of the common hook parts can be connected to one another to join together, in series, two separate pieces of line or cord. In yet another arrangement, three or more of the common hook parts can be joined together into a closed loop to thus bring together three or more lines or cords attached to the hook parts at a common area (for example, to secure a load within the bed of a pick-up truck).

In the following description, we will use the term "hook-connector device", or "hook-connector", to mean a device that includes two essentially identical "hook parts". Each hook part can function separately as a hook, to thereby secure a line or cord to an anchor point. Further, each hook part can alternatively serve as a connector part (in conjunction with another hook part to thereby secure two lines together in series, or three or more lines together at a common area. It will be appreciated from the following description that the hook-connector device described herein provides a high degree of flexibility of use with respect to the primary components thereof (i.e., the first hook part and the second hook part), as described more fully below. That is, the first hook part and the second hook part of the hook-connector device described herein can be connect to one another in various ways, as well as with subsequent third and additional hook parts (all of essentially similar configuration) to provide a hook-connector system having a high degree of flexibility of use to thereby address a variety of needs, such as securing loads.

It will further be appreciated that the hook-connector device described herein can be used to securely connect two ends of a single cord together, as well as to connect two or more cords in series. Further, the hook-connector device described herein can be used to securely connect three or more separate cords together at a common area. As used herein, the term "cord" means any elongated, flexible member. Non-limiting examples of a "cord" include: rope; twine; cable; chain; string; elastic cords (i.e., a "Bungee cord"), elongated rubber strands, etc. For example, the hook-connector device described herein can be used to securely connect two ends of a delicate jewelry chain used in a woman's necklace, as well as to secure two docking ropes in series for a super-tanker. While not limiting the scope of the current claims, a typical intended use of the hook-connector device described herein is to secure loads in the bed of a pick-up truck. In the last example (i.e., securing loads in the bed of a pick-up truck), the hook-connector device described herein can be used to: (1) secure a cord to an anchor point in the bed of the pick-up truck; (2) join together two or more cords in series to span the bed of the pick-up truck; and/or (3) join together three or more cords at a common area, each cord being secured to separate anchor points in the bed of the pick-up truck.

From the foregoing it will thus be appreciated that the hook-connector device described herein provides a high degree of flexibility of use with respect to securing one or more cords to anchor points and/or to one another. This flexibility of use of the hook-connector device described herein is enabled by the generally common design of the two primary components of the hook-connector device, that is, the first hook part and the second hook part.

Figure 1:
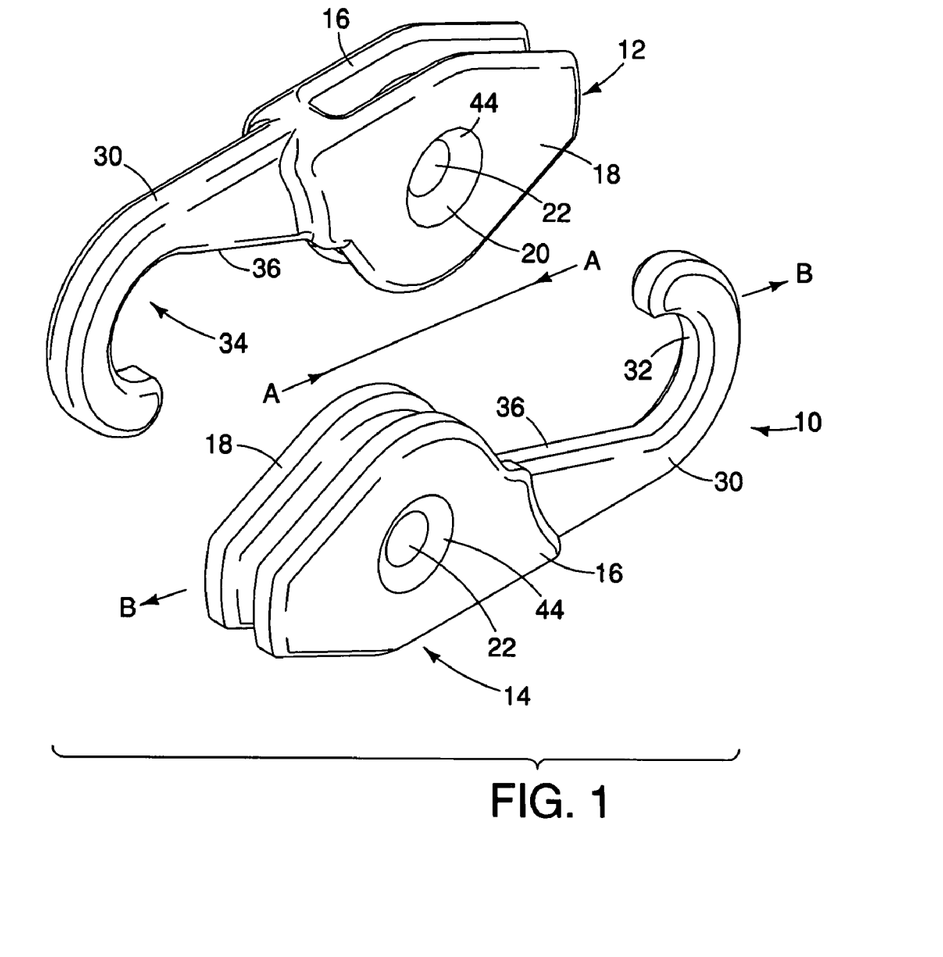
FIG. 1 is an isometric drawing of a hook-connector device in accordance with the present disclosure.
Figure 6:
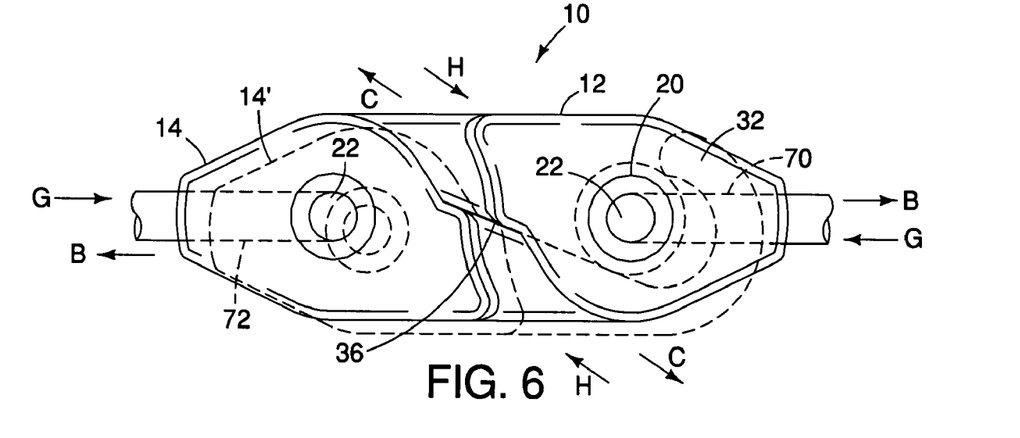
FIG. 6 is a side elevation view of the hook-connector of FIG. 1, depicting a first embodiment of how two of the hook parts of FIG. 1 can be connected to one another.

Turning now to FIG. 1, a hook-connector device 10 in accordance with the present disclosure is depicted in an isometric view. The hook-connector device 10 includes a first hook part 12 and a second hook part 14. As depicted in FIG. 1, the first hook part 12 and the second hook part 14 are configured to be engaged with one another in a first arrangement, to thereby result in the connection depicted in FIG. 6. This engagement (or connection) of the first hook part 12 and the second hook part 14, as depicted in FIGS. 1 and 6, is accomplished by: (i) first moving the first hook part 12 and the second hook part 14 towards one another in relative angular direction "A", and then, once the first hook part 12 and the second hook part 14 are mated in resistive contact, (2) moving the first hook part 12 and the second hook part 14 away from one another in relative linear direction "B", thus causing the first hook part 12 and the second hook part 14 to positively engage one another. As described more fully below (and with particular relevance to FIGS. 7, 8 and 11), other arrangements for connecting the first hook part 12 and the second hook part 14 can also be provided.

Again with respect to FIG. 1, as indicated previously, the hook-connector device 10 includes a first hook part 12 and a second hook part 14. Each hook part (12, 14) includes the following common components, describe below with respect to hook part 12 (it being understood that hook part 14 can include essentially similar components).

Figure 2:
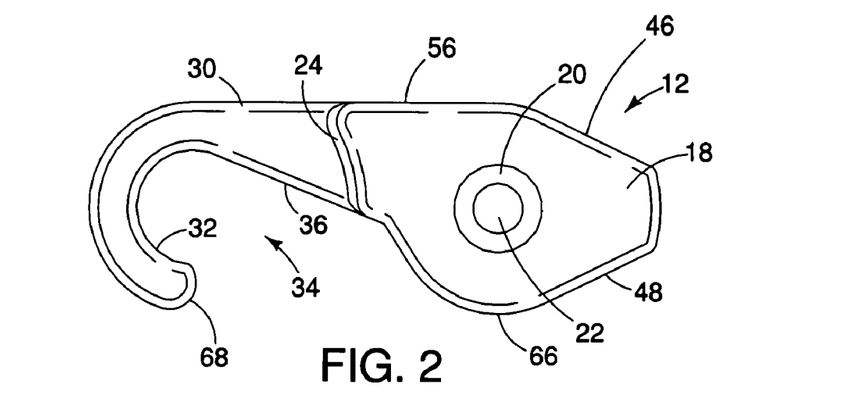
FIG. 2 is a side elevation view of one hook part of the hook-connector device of FIG. 1.
Figure 3:
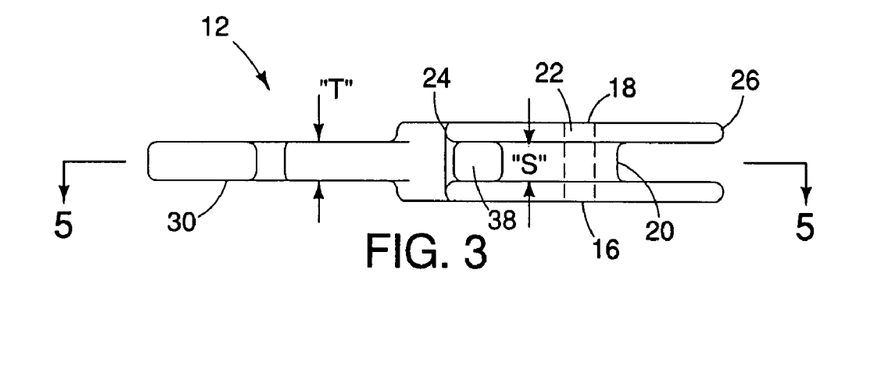
FIG. 3 is a bottom view of the hook part of FIG. 2.
Figure 4:
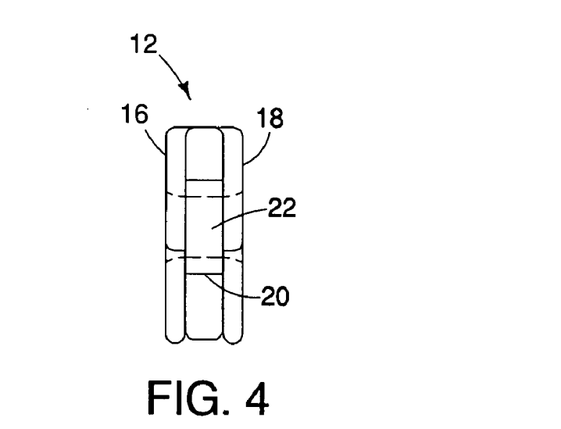
FIG. 4 is an end view of the hook part of FIG. 2.
Figure 5:
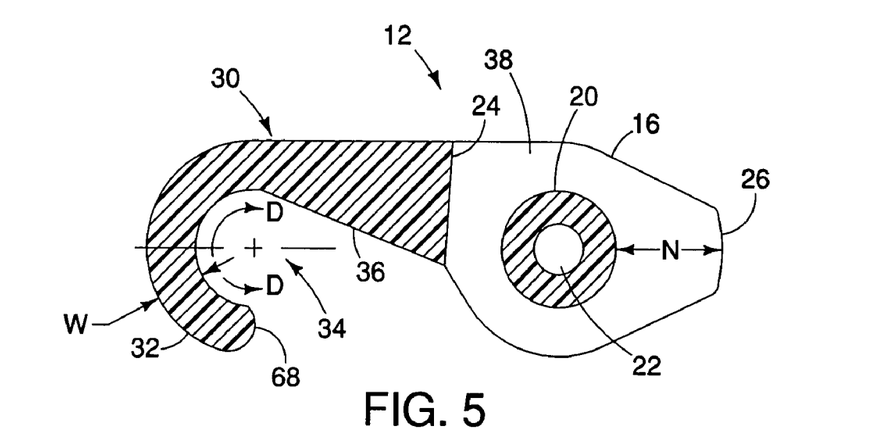
FIG. 5 is a side sectional view of the hook part of FIG. 2.

With respect to hook part 12 (and essentially hook part 14), hook part 12 includes a first plate 16, a second plate 18, and a hub 20 (all of which are better depicted in FIGS. 3-5, which respectively depict a bottom view, and end view, and a side sectional view of the hook part 12 of FIG. 2). The hub 20 is disposed between the first plate 16 and the second plate 18, and holds the first plate 16 and the second plate 18 in essentially parallel, spaced apart relationship to one another. Additionally, the hub 20, and the first and second plates (16, 18) define there-through a cord opening 22. (Cord opening 22 is further depicted in FIGS. 2-5.) Plates 16 and 18 can each be provided with a chamfer 44 at the cord opening 22. Chamfer 44 facilitates freedom of movement of a cord passed through cord opening 22, and further 44 reduces frictional wear on a cord passed through cord opening 22, thus extending the life of the cord.

Each hook part (12, 14) further includes a hook member 30, which is attached to a first end (24, FIGS. 2, 3 and 5) of the first and second plates (16 and 18, respectively). The hook member 30 includes a hook element 32, which defines a hook opening 34 (FIGS. 1, 2 and 5). The hook opening 34 is sized to receive the hub (20) of a corresponding hook part. That is, the hook opening 34 of hook part 12 is sized to receive the hub 20 of hook part 14, while the hook opening 34 of hook part 14 is sized to receive the hub 20 of hook part 12. Further, the first and second plates (16, 18) are spaced apart by a distance "S" (FIG. 3), and the hook member 30 is defined by a thickness "T" that is slightly less than dimension "S" to thereby allow the hook element 32 to fit over the hub 20 of a corresponding hook part, but not be loose in fit between the plates (16, 18).

Further, as discussed below, in one embodiment the hook element 32 (and the corresponding hook opening 34 defined thereby) of the first part 12 are sized so that that the hub 20 of the second hook part 14 is resistively received by hook element 32 of the first hook part 12. That is, in this embodiment, a slight resistive force needs to be overcome in order for the hook element 32 of the first hook part 12 to engage the hub 20 of the second hook part 14. (It will be appreciated that the roles of the hook element 32 of the first hook part 12, and the slight resistive force required to engage the hub 20 of the corresponding second hook part 14, are completely interchangeable, such that the hook element 32 of the second hook part 14 requires a slight resistive force to engage the hub 20 of the corresponding hook part 12.) In order to achieve this slight restive force, and with respect to FIG. 5, the hook element 32 circumscribes a distance "D-D" that is slightly greater than 180 degrees. That is, put another way, the hook opening 34 (defined by the hook element 32) circumscribes a distance of slightly less than 180 degrees (but more than about 160 degrees). Further, the hook element 32 is fabricated from a material that has a slight amount of flexibility and resilience so that it will deform slightly and snap over the hub 20 of a corresponding hook part when a sufficient force is applied to the hook element 32. By "sufficient force" we mean a force that is sufficient to cause the hook element 32 to deform to the extent that the hook opening 34 can now receive the hub 20 of a corresponding hook part (12 or 14). The "sufficient force" is applied to the hook element 32 by way of forcing the hook element 32 against the hub 20 of a corresponding hook part (12 or 14). Once the hook element 32 has passed the major diameter of the hub 20 of a corresponding hook part (12 or 14), the resilience in the hook element 32 causes the hook element 32 to assume it's original shape, thus capturing the hub 20 of a corresponding hook part, and thereby securing the two hook parts (12 and 14) to one another.

It will further be appreciated (as discussed further below), that to disengage the hook element 32 of the first hook part 12 from the hub 20 of the second hook part 14, pressing the hub 20 of the second hook part 14 (which is partially encompassed by the hook element 32 of the first hook part 12) against the hook element 32 of the first hook part 12 will cause the hook element 32 (of the first hook part 12) to deform, thus expanding the hook opening 34 of the first hook part 12 so that the hook element 32 of the first hook part 12 can freely pass over the hub 20 of the second hook part 14. It will further be appreciated that, with respect to the foregoing description, the roles of (1) the hook element 32 of the first hook part 12, and the hub 20 of the second hook part 14, are entirely interchangeable with respect to the roles of (2) the hook element 32 of the second hook part 14, and the hub 20 of the first hook part 12. That is, the common design of the first hook part 12 and the second hook part 14 allow the hook parts (12, 14) to interact with one another in essentially similar and complementary ways in (1) securing the hook parts (12, 14) to one another, as well as (2) allowing the hook parts (12, 14) to be disengaged from one another.

As depicted in FIGS. 1, 2 and 5, the hook member 30 (of either the first or second hook part 12 or 14) defines a sloped portion 36 that is configured to slidingly mate against the sloped portion 36 of the corresponding hook part (respectively, hook part 14 or 12) in one mating (or engagement) configuration of the first and second hook parts (12 and 14), as depicted in FIG. 6. In FIG. 6 the dashed line depicting second hook part 14' shows the hook part 14' just prior to being secured to the first hook part 12 (i.e., by pulling in direction "B" on cords 70 and 72 that are passed through the cord openings 22 of respective hook parts 12 and 14), thus causing the hook parts 12 and 14 to initially move together in direction "H" as a result of the sliding engagement of the sloped portions 36 of each hook member 30. Once the first and second hook parts (12, 14) have reached the extend of their directional travel in direction "H", further pulling on the cords 70 and 72 in direction "B" will cause the first hook part 12 and the second hook part 14 to securely mate to another in the manner described above.

Likewise, to disconnect the hook parts 12 and 14 from the position depicted in FIG. 6, a user merely has to push the two ends of the assembly (1) together in directions "G" and the sloped portions 36 of the hook members 30 will cause the hook parts 12 and 14 to move in directions "C", thus separating the hook parts 12 and 14 from one another (in the manner described above). As discussed more fully below (and in particular, with respect to FIG. 9), the configuration depicted in FIG. 6 is particularly useful to form a closed loop of cords.

Returning to FIG. 5, the hub 20 is positioned relative to the second end 26 of the first plate 16 (as well as with respect to the second end of the second plate 18, of FIG. 3) so as to define a distance "N" between the rearward edge of the hub and the second (26) end of plates 16 and 18. Further, the hook element 32 (FIG. 5) is defined by a width "W" that is approximately one-half of distance "N". Thus, when hook parts 12 and 14 are connected as depicted in FIG. 6, the hook element 32 of each hook part is recessed in a pocket defined between the plates 16 and 18. The advantage of this arrangement is that when a user pushes the two ends of the hook assembly 10 (of FIG. 6) together in directions "G", there will be room for the hook elements 32 of each hook part (12, 14) to move away from the hubs 20 of the corresponding hook parts (14 and 12, respectively), yet still allow the hook elements 32 to stay in the pockets between the plates 16 and 18 (and thus not allow the hook elements 32 to come into contact with the users fingers, which would defeat the disconnecting action of pressing the hook parts 12 and 14 together in direction "G" to disengage them from one another).

Figure 7:
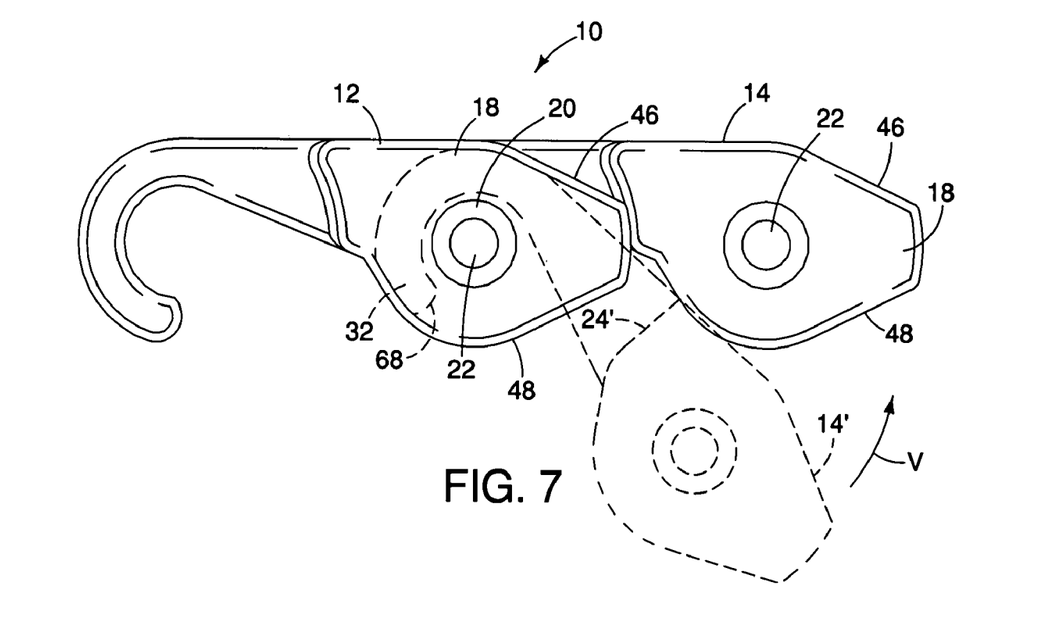
FIG. 7 is a side elevation view of the hook-connector of FIG. 1, depicting a second embodiment of how two of the hook parts of FIG. 2 can be connected to one another.
Figure 11:
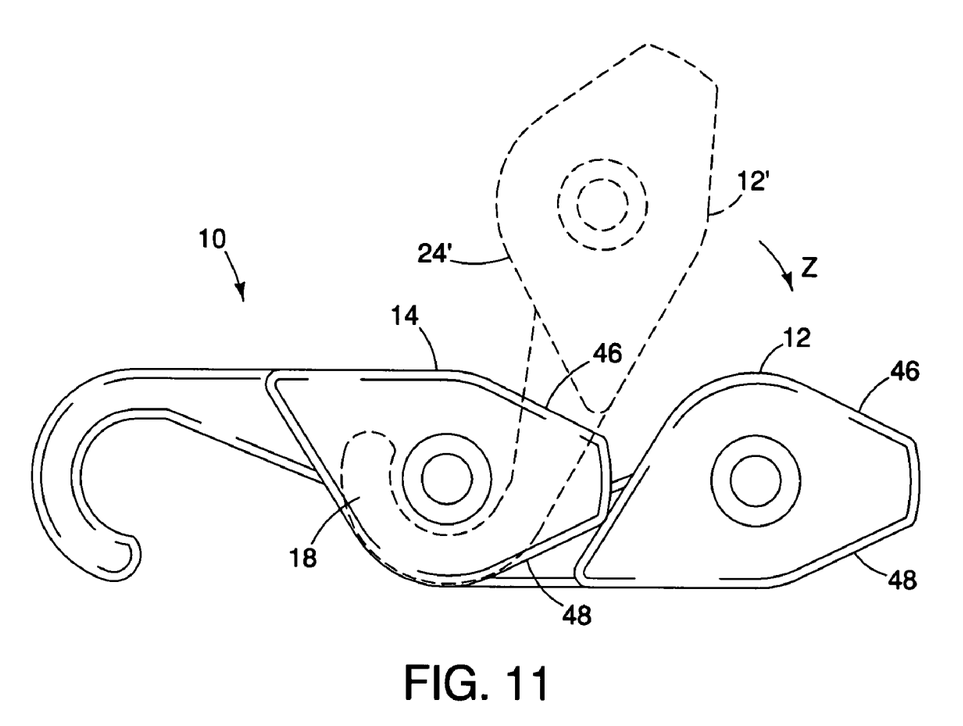
FIG. 11 is a side elevation view of the hook-connector of FIG. 1, depicting a further embodiment of how two of the hook parts of FIG. 10 can be connected to one another.

In a second application of use, as depicted in FIG. 7, the first and second hook parts 12 and 14 can be aligned end-to-end, such that the hook element 32 of the second hook part 14 engages the hub 20 of the first hook part 12, and the hook member 30 of the first hook part 12 is left free to engage a tertiary element (such as a tie down point, or yet a third hook element). Similarly, as depicted in FIG. 11, first and second hook parts 12 and 14 can be inverted with respect to one another and connected in series. While there is no particular advantage to how the hook parts 12 and 14 are connected in series (i.e., as depicted in either FIG. 7 or FIG. 11), what is noteworthy is that the hook-connector system 10 provides a user with system for connecting 2 cords in series without undue effort required on the part of the user to correctly align the hook parts 12 and 14.

In FIGS. 7 and 11 engagement of the first hook part 12 and the second hook part 14 is achieved by guiding the hook end 68 (FIGS. 2, 5 and 7) into the hook passage 38 (FIG. 3), and forcing the hook opening 34 (FIG. 5) over the hub 20 (FIGS. 3, 5 and 7) of the corresponding hook part until the hook element 32 (FIGS. 2, 5 and 7) securely engages the hub (in the manner describe more fully above). In respect of FIG. 7, it will be appreciated that the angled lower end portion 48 of plate 18 (of first hook part 12, as well as and plate 16 of hook part 12, which is not visible in FIG. 7, but can be seen in FIG. 3) allows clearance with the angled first end 24' of second hook part 14, as second hook part 14 is initially engaged with first hook part 12 (as indicated by dashed lines indicating second hook part 14' before being moved to the position indicated by second hook part 14). Likewise, in respect of FIG. 11, the upper angled end portion 46 of the second plate 18 (and plate 16, which is not visible in FIG. 11, but can be seen in FIG. 3) of second hook part 14 allows second hook part 14 to avoid interference with the angled portion 24' of first hook part 12 (12') as first hook part 12 is moved in direction "Z" from the position indicated by first hook part 12' and first hook part 12. That is, the angled upper end portion 46 of plates 16 and 18 (FIGS. 2 and 3), and the angled lower end portion 48 of plates 16 and 18 (FIGS. 2 and 3), allow for the first and second hook parts 12 and 14 to be connected in series, regardless of orientation of the hook parts, because the angled upper end portion 46, and the angled lower end portion 48 of plates 16 and 18 are configured to avoid an interference fit problem with the first end 24 of the plates (16 and 18) of a corresponding hook part.

Figure 8:
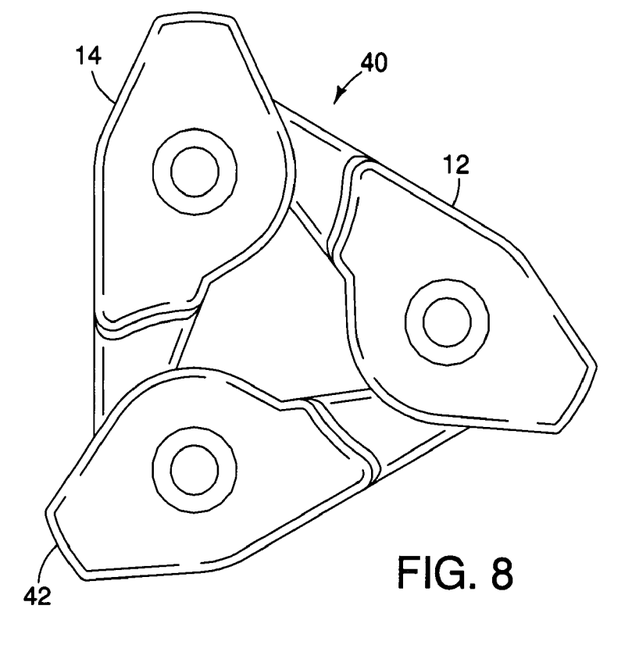
FIG. 8 is a side elevation view depicting a third embodiment of how three of the hook parts of FIG. 2 can be connected to one another.

While, in the Figures, the angled upper end portion 46 and the angled lower end portion 48 of plates 16 and 18 are depicted as being straight angled sections (see FIG. 2, for example), it will be appreciated that the angled upper end portion 46 and the angled lower end portion 48 of plates 16 and 18 can also be curvilinear. The guiding design principal behind the angled upper end portion 46 and the angled lower end portion 48 of plates 16 and 18 is that they avoid interference with the first end 24 of plates 16 and 18 (in a corresponding hook part) as the first and second hook parts 12 and 14 are mated together as depicted in FIGS. 7, 8 and 11.

Returning to FIG. 7, it will be appreciated that once the hook element 32 of the second hook part 14 snaps around the hub 20 of the first hook part 12, the hook parts (12 and 14) may then freely rotate with respect to each other, without risk of becoming disengaged from one another. In fact, as depicted in FIG. 8, by rotating first and second hook parts (12 and 14) 120 degrees (from the position depicted in FIG. 7), a third hook part 42 can be added (i.e., connected) to first and second hook parts 12 and 14, thus forming a closed loop 40 of hook parts (12, 14 and 42). Indeed, it will be appreciated that the loop 40 of hook parts can be expanded to include four, five, or as many hooks parts as is desired. This allows a plurality of cords (as many cords as hook parts) to be joined together at a common area. For example, to secure a load in the bed of a pick-up truck having six anchor points around the perimeter of the bed, six hook parts can be connected in a loop (following FIG. 8), each hook part being secured to one end of a respective cord. The other ends of the six exemplary cords can then be secured to the six anchor points using six more hook parts. As can be seen, it is thus possible to configure complex networks of cords for whatever use is desired using multiples of a single common hook part (such as the common hook part 12 depicted in FIGS. 2-5).

Returning to FIG. 2, as depicted therein the first end 24 of the second plate 18 is slightly curved (and likewise, for the first end of the first plate 16, as can generally be seen in FIG.

Figure 10:
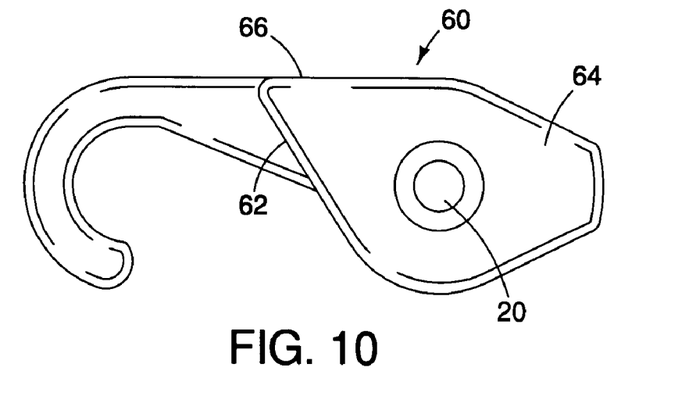
FIG. 10 is a side elevation view of variation of a hook part of FIG. 2.

1). This curve allows the first and second hook parts (12, 14) to mate to one another in each of the configurations depicted in FIGS. 6, 7 and 11 without binding between the first and second hook parts (12, 14). Turning now to FIG. 10, one variation of a hook part 60 is depicted. In this variation the first end 62 of second plate 64 is not curved, but rather is flat, and angles downward from a top edge 66 of the hook part 60 towards the centerline of the cord opening 20. (It is understood that the same modification would apply to the first plate of the hook part 60, which is not visible in this view. It will also be understood that this modification would be made to the complimentary hook part of a hook-connector device similar to the device 10 depicted in FIG. 1.) The variation to the first end 62 of the hook plate 64 of FIG. 10 also achieves the function of allowing first and second hook parts (60, and a essentially identical twin, not shown) to mate in each of the configurations depicted in FIGS. 6, 7 and 11, and without binding between the hook parts.

Figure 9:
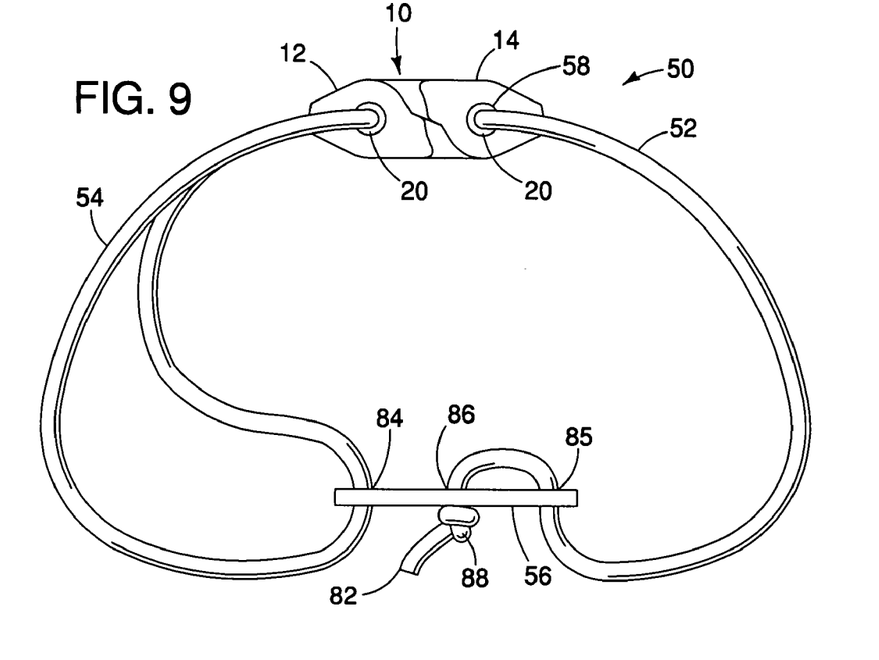
FIG. 9 is a view depicting load securing system that includes the hook-connector of FIG. 1, along with cords connected to each other by a cord length adjustment member.

Turning now to FIG. 9, a further embodiment provides for a load securing system 50. The load securing system 50 includes a hook-connector 10 (as depicted in FIGS. 1 and 6, and described above). The load securing system 50 further includes a first length of cord 54 forming a loop and passing through the cord opening 20 in the first hook part 12. The system also includes a second length of cord 52 which is defined by a second cord first end 58 (which, in FIG. 9 is hidden behind the second hook part 14) and second cord second end 82. The second cord first end (58) is received within, and terminates at, the cord opening 20 in the second hook part 14. The second cord first end (58) can be prevented from freely passing through the cord opening 20 by knotting the cord end 58, or attaching a blocking device to the cord end 58, or by securing the cord end 58 to the cord 52 proximate the cord opening 20 in the second hook part 14. The system 50 further includes a cord length adjustment member 56, which, as depicted in FIG. 9 in side view, consists of a flat plate having three cord holes (84, 85 and 86, not clearly visible in FIG. 9 because of the side view of the cord length adjustment member 56). As depicted, the first length of cord 54 passes through the first cord hole 84. Further, the second cord (52) second end 82 first passes through the second cord hole 85, and then passes through, and terminates at, the third cord hole 86. The second cord second end 82 is knotted (88) or otherwise prevented from passing out through the third cord hole 86. To adjust (e.g., shorten) the size of the loop formed by the first and second cords (54, 52), a length of the second cord 52 is first pushed through the second cord hole 85 to form a short loop of cord between the second and third cord holes (85, 86). Then the second cord second end 82 is pulled downward to take up the slack cord in the short loop of cord between the second and third cord holes (85, 86). Since the cord holes 85 and 86 have relatively sharp edges, the cord 52 will bind against the cord length adjustment member 56. In this way, an adjustable length loop of cord can be formed to, for example, secure a bundle of PVC pipes, and the hook-connector 10 can be used for quick and easy closing and opening of the loop.

It will be appreciated that plates 16 and 18 can be slightly curved so as to increase the distance "S" there between at the second end 26 of the plates (see FIG. 3) to thereby facilitate engagement of the hook member 30 of a corresponding hook part. Further, plates 16 and 18 do not need to be solid, but can have holes formed there through to reduce mass and material requirements. It will be further appreciated that cord opening 22 does not need to be round, as is depicted in the figures. Further, sloped portion 36 of the hook member 30 (see FIGS. 2 and 5) does not need to be linear (as depicted), but can also be curved to provide an enhanced "camming" action between sloped portions 36 of the hook parts 12 and 14.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A hook-connector, comprising:
   a first hook part; and
   a second hook part; and
   wherein the first hook part and the second hook part each comprise:
   a first plate and a second plate;
   a hub disposed between the first and second plates, holding the first and second plates in essentially parallel, spaced apart relationship, and wherein the hub and the first and second plates define a cord opening there-through;
   a hook member attached to a first end of the first and second plates, the hook member including a hook element defining a hook opening, and wherein:
   the hook opening is sized to receive the hub of a corresponding hook part;
   the hook member defines a sloped portion configured to slidingly mate against the sloped portion of the corresponding hook part in one mating configuration of the first and second hook parts; and
   the hook opening circumscribes an opening of less than 180 degrees, and greater than about 160 degrees.

2. The hook-connector of claim 1 and wherein the hub is positioned between the first and second plates at a position to define between the hook member and the hub a hook passage, and wherein the hook passage is sized to receive the hook element of the corresponding hook part.

3. The hook-connector of claim 1 and wherein the hook member is defined by a thickness which is less than a distance defined between the first and second plates.

4. The hook-connector of claim 1 and wherein:
   the first and second plates are each defined by a second end which is distal from the first end of the plates, thereby defining an open-end distance; and
   the hook element is defined by a width which is not greater than two-thirds of the open-end distance.

5. The hook-connector of claim 1 and wherein the first hook part and the second hook part are essentially identical.

6. The hook-connector of claim 1 and wherein the first and second plates are each defined by a tapered portion leading to the cord opening.

7. The hook-connector of claim 1 and wherein the hook element is fabricated from a flexible, resilient material to thereby allow the hook element to deform and thereby allow the hook opening to fit over the hub of the corresponding hook part.

8. The hook-connector of claim 1 and wherein the first end of the first and second plates is angled from an upper side of the plates towards the cord opening.

9. The hook-connector of claim 1 and wherein the first and second plates each define an upper end portion of the plates, and wherein the upper end portion of the plates is angled downward from an upper side of the plates towards the cord opening as the upper end portion of the plates approaches a second end of the plates which is distal from the first end of the plates.

10. The hook-connector of claim 1 and wherein the first and second plates each define a lower end portion of the plates, and wherein the lower end portion of the plates is angled upward from a lower side of the plates towards the cord opening as the lower end portion of the plates approaches a second end of the plates which is distal from the first end of the plates.

11. A load securing system, comprising:
   a hook-connector according to claim 1;
   a first length of cord forming a loop and passed through the cord opening in the first hook part;
   a second length of cord defined by a second cord first end and second cord second end, the second cord first end being received within, and terminating at, the cord opening in the second hook part;
   a cord length adjustment member comprising a flat plate having defined there-through three cord holes; and wherein:
   the first length of cord passes through a first of the three cord holes; and
   the second cord second end passes through a second of the cord holes, and passes through, and terminates at, a third of the three cord holes, and is configured to prevent the second cord second end from passing out through the third of the cord holes.

* * * * *